United States Patent [19]

Smith et al.

[11] Patent Number: 4,932,500
[45] Date of Patent: Jun. 12, 1990

[54] LUBRICATION INSERTION SYSTEM

[75] Inventors: Dennis W. Smith, Phoenix, Ariz.; Hugh B. Matthews, Sr., Sanford, N.C.

[73] Assignee: Honeywell Inc., Minneapolis, Minn.

[21] Appl. No.: 396,256

[22] Filed: Aug. 21, 1989

[51] Int. Cl.$^5$ .............................................. F16C 1/24
[52] U.S. Cl. ........................................ 184/5.1; 184/8; 384/466; 384/470
[58] Field of Search .................. 184/5.1, 6.28, 8; 384/466, 470, 528, 527

[56] References Cited

U.S. PATENT DOCUMENTS

| | | | |
|---|---|---|---|
| 2,838,348 | 6/1958 | Hamm | 384/466 |
| 3,096,129 | 7/1963 | Hay | 384/470 |
| 4,343,378 | 8/1982 | Bremer | 184/6.26 |
| 4,345,799 | 8/1982 | Crofts | 384/470 |

FOREIGN PATENT DOCUMENTS 0044878 8/1908 Switzerland ................... 384/528

Primary Examiner—Ira S. Lazarus
Assistant Examiner—Alan Cariaso
Attorney, Agent, or Firm—Arthur A. Sapelli; D. J. Lenkszus; A. Medved

[57] ABSTRACT

The lubrication insertions system of the present invention inserts lubricating oil into the critical areas of a bearing. The system comprises a delivery element for delivering lubricating oil to a predetermined point relative to the bearing. The bearing, which is rotating, causes the lubricating oil to be slung outward of the spin axis of the bearing. A cage element, having a lip that extends beyond the edge of the bearing, captures the lubricating oil and directs the lubricating oil into the bearing to the outer race of the bearing and to the rolling elements of the bearing, which track the oil to the inner race of the bearing.

10 Claims, 4 Drawing Sheets

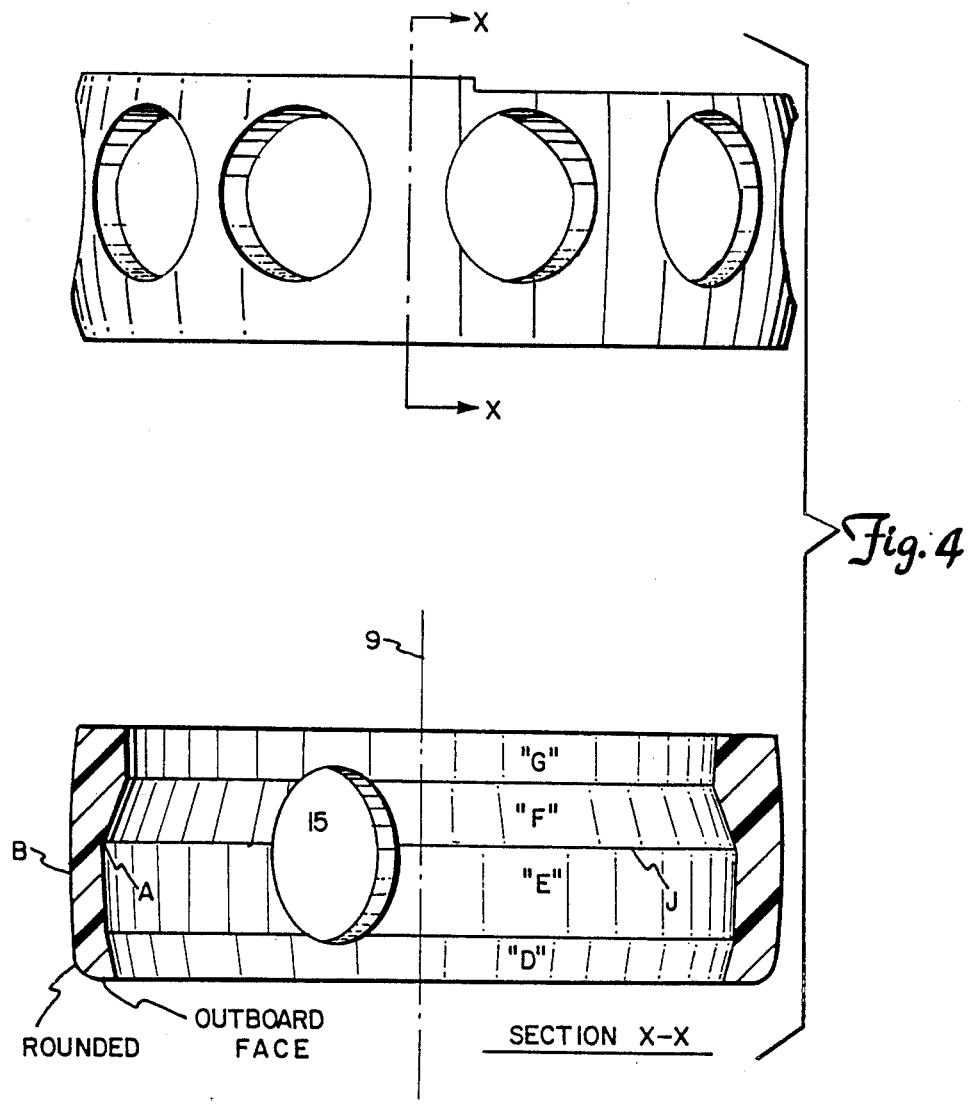

LUBRICATION INSERTION SYSTEM

BACKGROUND OF THE INVENTION

This invention was made with United States Government support and the United States Government has certain rights therein.

This invention relates to bearings, and more particularly, to an apparatus for lubricating the bearing.

In an effort to extend the life of a bearing, previous systems have been developed for adding lubricating materials (usually some type of oil) to the bearing while in operation. (note that the term "oil" used herein is intended as a generic lubricating material and is intended to include oil, synthetic oil, graphite, grease, . . . ) These previous systems have many problems associated therewith. An oil mist system does not permit the required control for the oil placement; also too large a quantity of oil must be injected at predetermined times. A cone injection system lacks precise delivery of the oil to the contact area of the bearing, and also requires a relatively large amount of space outboard of the bearing. An outer race injection system includes a hole through the stationary ring of a ball bearing. The hole intersects the race just outside of the ball-race contact zone. Oil which is fed through the hole hits the passing balls and is thereby distributed. A problem with the distribution system is that the ball, moving at a relatively high speed and simultaneously spinning about its own axis, tends to sling the oil causing part of the oil to be distributed to non-useful parts of the bearing. The second problem with this distribution system is the proximity of the injection hole to the running track.

Thus there is a need to provide a system which can deliver oil to the running track of the bearing and eliminates the problems of the previous systems identified above. The present invention provides an active lubrication system which injects predetermined quantities of oil to the contact area of the bearing thereby eliminating the problems of the previous systems.

SUMMARY OF THE INVENTION

Therefore, there is supplied by the present invention, a system for inserting oil into the critical areas of a bearing, which has rolling elements. The system comprises a delivery element for delivering lubricating oil to a predetermined point relative to the bearing. The bearing, which is rotating about a spin axis, causes the lubricating oil to be slung outward of the spin axis of the bearing. A cage element, having a lip which extends outboard of the outboard bearing face, captures the lubricating oil to direct the lubricating oil to the outer race of the bearing and to the rolling elements of the bearing, which track the oil to the inner race.

Accordingly, it is an object of the present invention to provide an apparatus for adding oil into a bearing.

It is another object of the present invention to provide an apparatus for adding predetermined amounts of oil into a bearing.

It is still another object of the present invention to provide an apparatus for adding predetermined amounts of oil into a critical area of a bearing.

It is a further object of the present invention to provide an apparatus for adding predetermined amounts of oil into a critical area of a bearing without interfering with normal operation of the bearing.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 4 shows a diagram of a cage of the preferred embodiment of the present invention.

DETAILED DESCRIPTION

Figure 1:
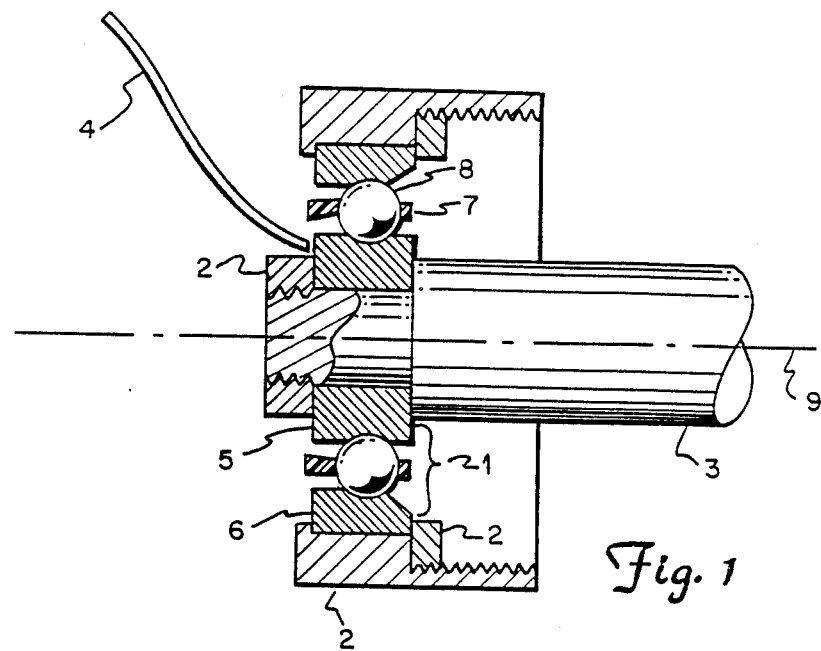
FIG. 1 shows a partial sectional view of a bearing mounted on a rotatable shaft and incorporating the lubrication system of the present invention.

Referring to FIG. 1, there is shown a partial sectional view of a bearing mounted on a rotatable shaft and incorporating the lubrication injection system of the present invention. A bearing 1 is shown contained in a cartridge 2, and driven by a shaft 3 around a spin axis 9. The bearing 1, includes an inner race 5, an outer race 6, a cage 7, and the balls 8 (or rolling elements) of the bearing. Lubricating fluid/material is delivered to the bearing 1 via a delivery tube (or more simply referred to herein as tube) 4. (Note that the term "oil" will be used hereinafter to refer to lubricating fluid/material and is intended to be generic to include oil, grease, synthetic oil, graphite, . . . )

Figure 2:
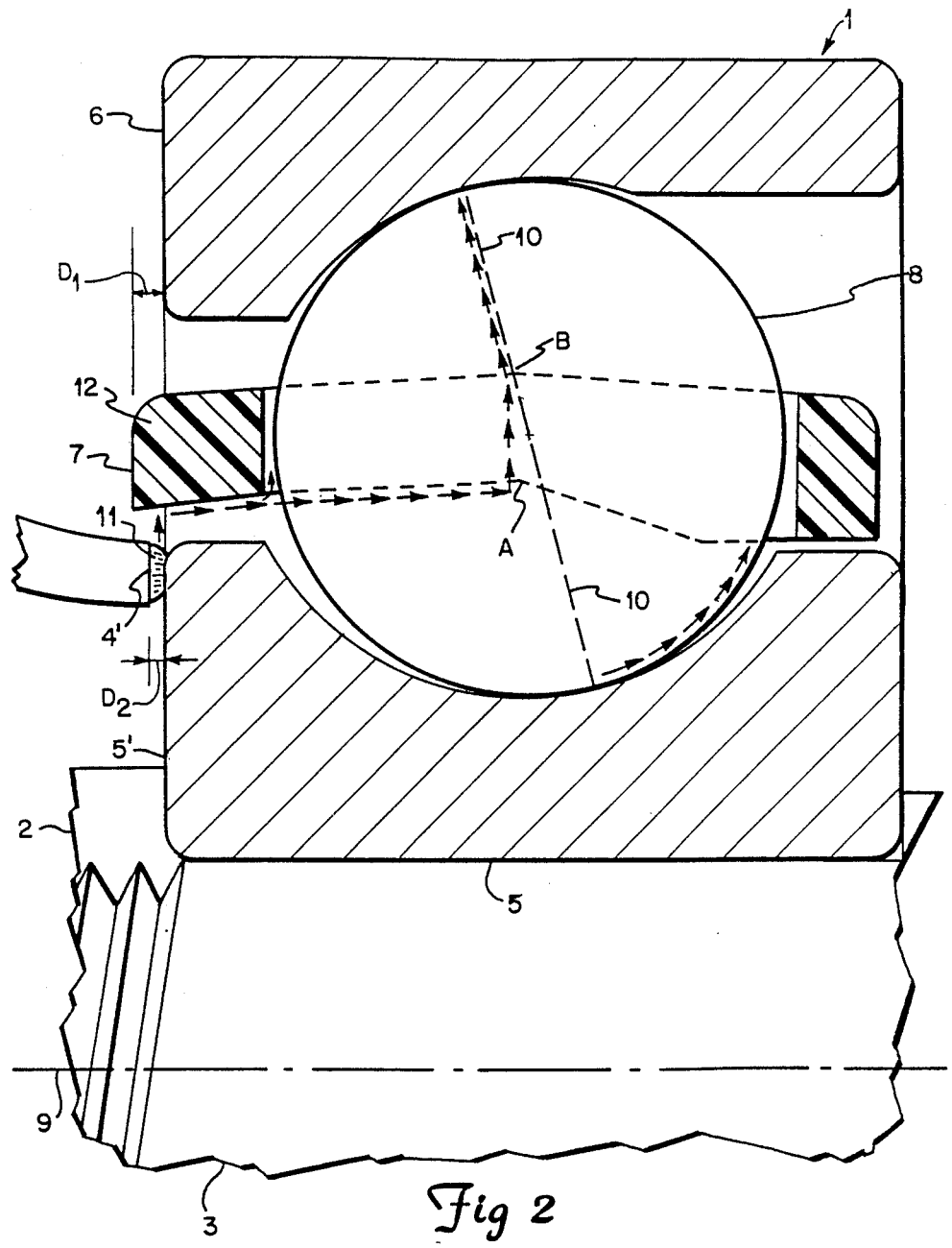
FIG. 2 shows an expanded partial view of the bearing, including a showing of the path of the oil flow.

The operation of the lubrication insertion system will now be described. Referring to FIG. 2, there is shown an expanded partial sectional view of the bearing 1, and includes a showing of the path of the oil from the delivery tube 4 to the running track 10 of the ball. When lubrication of the bearing 1 is desired, oil is pumped to the delivery tube 4 in predetermined quantities. In the preferred embodiment of the present invention, the face of the delivery tube 4' is parallel to the outboard face of the inner race 5', and placed a distance $D_2$ therefrom. As the oil is pumped to/through the delivery tube 4, a hemisphere of oil begins to form at the face of the delivery tube 4. (The distance $D_2$ is selected such that a droplet of oil 11 being formed at the face of the delivery tube 4 contacts the inner race 5 before the hemisphere of oil completes its formation and drops off.) When the droplet of oil 11 is large enough, it contacts the inner race 5 of bearing 1, which is rotating with the shaft 3 about the spin axis 9. Viscous coupling between the oil and inner race 5 imparts momentum to the oil droplet 11 propelling it tangentially to the inner race 5 and outward from the spin axis 9 to the cage 7. The outboard portion of cage 7 extends a distance $D_1$ from the outboard face of the inner race 5, the distance $D_1$ being greater than the distance $D_2$. Oil droplets 11 propelled outward by the spinning inner race 5 are caught by the extended portion of cage 7 and directed into the bearing.

At least part of each oil droplet 11 adheres to the cage 7 while some of the oil droplet 11 deflects off the cage 7 surface. Any oil that is deflected off the cage 7 is directed toward the balls 8 due to the impingement angle of the cage 7 relative to the spin axis 9. All the surfaces of the inner and outer diameters of the cage 7 are angled so that the centrifugal forces acting on any oil on the surfaces of the cage 7 will direct that oil (dashed arrow line) to the ball pockets or to the point on the cage with the greatest outside diameter (Point B). The axial location of Point B, the point of greatest outside diameter is selected to coincide with the nominal operating contact angle (or running track) 10 of the bearing. Any oil not picked up by the ball 8 is slung outward such that the oil contacts the outer race 6 in the normal running track 10. Outside corner 12 of cage 7 is rounded such that any oil that might contact the outside face of the cage 7 creeps along the cage to Point B rather than being slung off the edge outside the bearing (secondary oil path shown by the dotted line).

Figure 3:
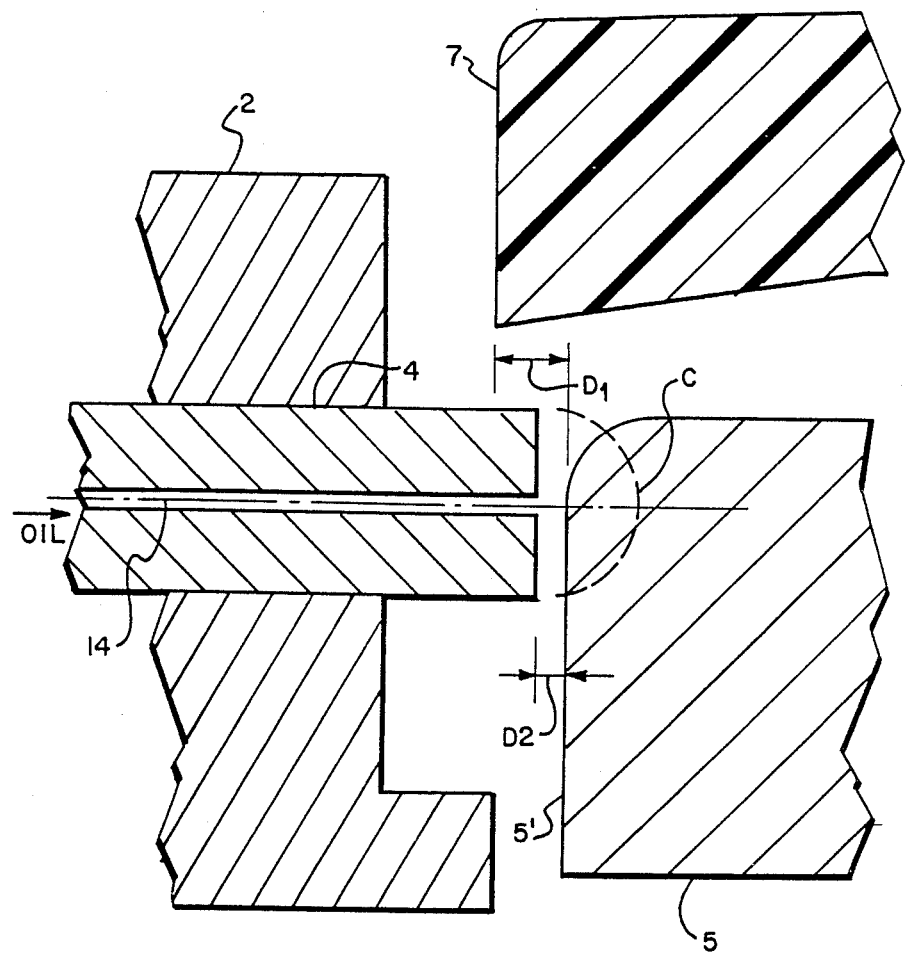
FIG. 3 shows a diagram of the placement of the delivery tube relative to the bearing.

Referring to FIG. 3, there is shown a diagram of the placement of the delivery tube 4. The placement and material of the delivery tube 4 is important to insure that the oil does not leak from it unintentionally. The material should be non-wettable to the oil used. In the preferred embodiment of the present invention a teflon material is used which forms the nozzle (ie., the delivery tube) 4. The end of the nozzle should be smooth and parallel to the outboard face of the inner race 5. The axis of the nozzle 14 should be perpendicular to the outboard face of the inner race 5, of the bearing 1. The nozzle face should also have a smooth surface finish and be kept as clean as possible in order to further minimize wettability. The dotted line C shows the hemisphere which would form as a result of microliter quantities of oil being pumped into the delivery tube 4 if the inner bearing race 5 were not present. Although only partially shown, it will be understood by those skilled in the art that the delivery tube 4 can be attached to and/or form part of the cartridge/cartridge clamp ring 2.

Referring to FIG. 4 there is shown a diagram of the cage (or bearing cage) 7. The cage of the preferred embodiment is a biased cage, well known to those skilled in the art, although it is not necessary in order to implement the lubrication system of the present invention. Section X—X shows the angles inside the cage 7 relative to the spin axis 9, and shows Points A and B referenced above. The outboard face of cage 7 includes the rounded corner to allow the oil flow, which contacts the outside face of cage 7, to creep to Point B as described above. Although surface "D", "E", "F", and "G" are, in the preferred embodiment, flat surfaces, it will be understood by those skilled in the art that these surfaces may be rounded. It is only necessary that the diameter of circles about the spin axis 9 along the surfaces D, E, and F, going inward toward the circle J, be increasing, the circle J having the largest diameter. This is to insure that oil on the surfaces D, E, and F will creep inward toward the circle J by the centrifugal forces acting on the oil. Note that Section X—X has all but one of the openings for the rolling elements (i.e., opening 15) omitted.

Figure 5:
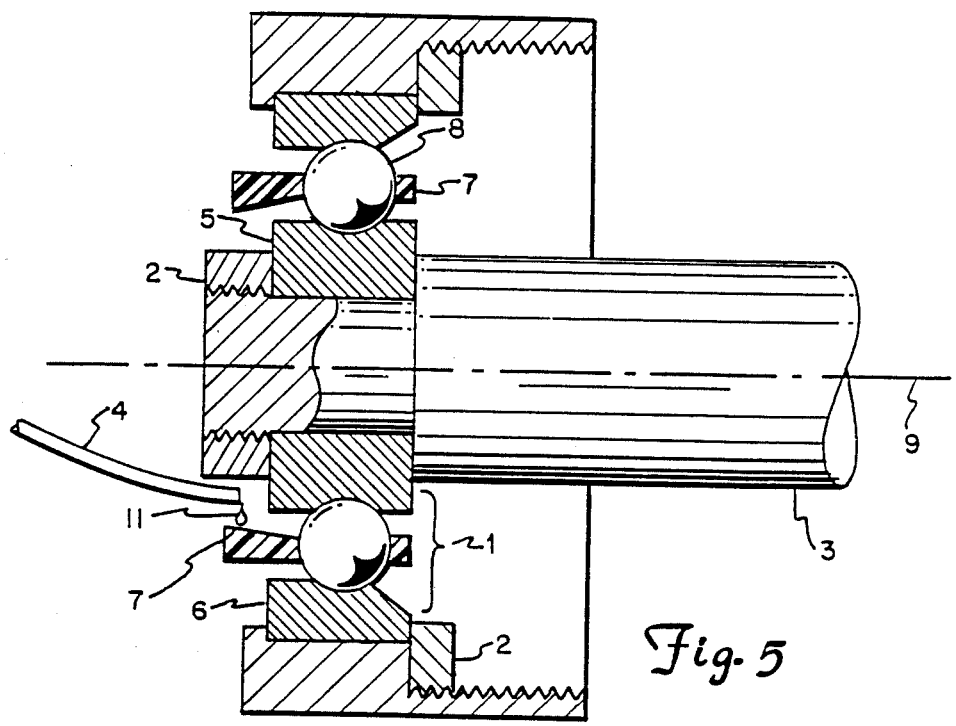
FIG. 5 shows a partional sectional view of an alternative embodiment of the lubrication system of the present invention.

Referring to FIG. 5, there is shown a partial sectional view of a bearing mounted on a rotatable shaft and incorporating an alternative embodiment of the lubrication system of the present invention. The delivery tube 4 delivers a drop (droplet) of oil 11 to a predetermined point relative to the bearing 1. The outboard portion of the cage 7 extends outward from the bearing 1 such that when the drop of oil 11 drops from the delivery tube (in this case a force such as gravity causes the droplet to be directed to the extended portion of the lip of cage 7), the oil droplet is caught or captured by the extended portion of cage 7, and due to the spinning of the bearing 1 about spin axis 9, the oil droplet is directed into the bearing 1 as described above. In this embodiment, the face of the delivery tube 4 need not be brought sufficiently close to the face of the inner race 5 to impede the growth of the oil droplet 11. In this instance it is desired that the oil droplet 11 "fall off" to the extended portion of cage 7 and take advantage of the available forces.

The insertion technique described above is especially effective in vacuum or partial vacuum conditions where fluid dynamic effects of gasses in the bearing cartridge will not interfere with the formation of the oil drop and the transfer of momentum from the inner race to the drop, although it will be understood by those skilled in the art that the system of the present invention will operate in any environment which does not have any external forces which prevents the formation of the oil drop, or substantially interferes with the oil flow as described herein. It will further be understood by those skilled in the art that modifications to the cage, and deliver tube can be made to overcome external forces within the scope of the present invention. Although the preferred embodiment describes the insertion system for a ball bearing, it will also be understood by those skilled in the art that the system is equally adaptable for other type bearings, including roller bearings, . . .

While there has been shown what is considered the preferred embodiment of the present invention, it will be manifest that many changes and modifications can be made therein without departing from the essential spirit and scope of the invention. It is intended, therefore, in the annexed claims to cover all such changes in modifications which fall within the true scope of the invention.

We claim:

1. A system for inserting a lubricating oil into a bearing, the bearing having rolling elements and an inner and outer race, each race having an outboard face which is essentially perpendicular to a spin axis of said bearing, the system comprising:
    (a) delivery means for delivering the lubricating oil to a predetermined point relative to the bearing; and
    (b) cage means, having an outward portion that protrudes beyond the predetermined point, for capturing the lubricating oil delivered to the predetermined point, to direct the lubricating oil to the rolling elements of the bearing, wherein the bearing has a predefined running track, and wherein the cage means has essentially a hollow cylindrical shape, having an outer and inner surface about a corresponding cylindrical axis, the inner surface of the cage means being sloped such that the diameter of a circle about the cylindrical axis and on the inner surface increases as the circle moves inward of the hollow of the cylinder to a maximum diameter inward of the hollow, the maximum diameter being essentially coincident with the running track of the bearing.

2. A system for inserting a lubricating oil into a bearing according to claim 1 wherein said delivery means is formed from a non-wettable material.

3. A system for inserting a lubricating oil into a bearing according to claim 1, wherein the system further comprises:
    cartridge means for holding said delivery means and said cage means in a predetermined relationship to one another.

4. A system for inserting a lubricating oil into a bearing according to claim 2, wherein the system further comprises:

cartridge means for holding said delivery means and said cage means in a predetermined relationship to one another.

5. A system for inserting a lubricating oil into a bearing, the bearing having rolling elements, an inner race and an outer race, each race having an outboard face which is essentially perpendicular to a spin axis, and wherein the bearing rotates about the spin-axis, the system comprising:

(a) delivery means for delivering the lubricating oil to a predetermined point relative to the bearing, said predetermined point being a point in close proximity to the outboard face of the inner race of the bearing such that a droplet of the lubricating oil being formed at an exit of the delivery means contacts the outboard face of the inner race; and (b) cage means, having an outward portion that protrudes beyond the predetermined point, for capturing the lubricating oil which is slung from the inner race due to the forces acting on the oil droplet deposited thereon caused by the rotation of the bearing.

6. A system for inserting a lubricating oil into a bearing according to claim 5, wherein the bearing has a predefined running track, and wherein the cage means has essentially a hollow cylindrical shape, having an outer and inner surface about a corresponding cylindrical axis, the inner surface of the cage means being sloped such that the diameter of a circle about the cylindrical axis and on the inner surface increases as the circle moves inward of the hollow of the cylinder to a maximum diameter inward of the hollow, the maximum diameter being essentially coincident with the running track of the bearing.

7. A system for inserting a lubricating oil into a bearing according to claim 6, wherein delivery means is formed from a non-wettable material.

8. A system for inserting a lubricating oil into a bearing according to claim 5, wherein the system further comprises:

cartridge means for holding said delivery means and said cage means in a predetermined relationship to one another.

9. A system for inserting a lubricating oil into a bearing according to claim 6, wherein the system further comprises:

cartridge means for holding said delivery means and said cage means in a predetermined relationship to one another.

10. A system for inserting a lubricating oil into a bearing according to claim 7, wherein the system further comprises:

cartridge means for holding said delivery means and said cage means in a predetermined relationship to one another.

* * * * *